(12) United States Patent
Wu (10) Patent No.: US 7,422,457 B1
(45) Date of Patent: Sep. 9, 2008

(54) PLUG-IN MODULE WITH IMPROVED LATCH MECHANISM

(75) Inventor: Jerry Wu, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/906,828

(22) Filed: Oct. 4, 2007

Related U.S. Application Data (63) Continuation-in-part of application No. 11/897,904, filed on Aug. 31, 2007.

(51) Int. Cl.
*H01R 13/62* (2006.01)

(52) U.S. Cl. ..................................... 439/258

(58) Field of Classification Search ................. 439/258, 439/257, 347–348, 372, 259, 157
See application file for complete search history.

(56) References Cited

U.S. PATENT DOCUMENTS

| | | | |
|---|---|---|---|
| 5,320,556 A * | 6/1994 | Otaka et al. | ................. 439/372 |
| 5,681,175 A * | 10/1997 | Busse et al. | ................. 439/157 |
| 6,749,448 B2 | 6/2004 | Bright et al. | |
| 6,824,416 B2 | 11/2004 | Di Mascio | |
| 6,851,867 B2 | 2/2005 | Pang et al. | |
| 6,884,097 B2 | 4/2005 | Ice | |
| 6,908,323 B2 | 6/2005 | Ice | |
| 7,052,306 B2 | 5/2006 | Ishigami et al. | |
| 7,064,959 B2 | 6/2006 | Kim | |
| 7,077,578 B2 | 7/2006 | Lee et al. | |
| 7,077,686 B2 | 7/2006 | Seo et al. | |
| 7,090,523 B2 | 8/2006 | Shirk et al. | |
| 2005/0170680 A1 * | 8/2005 | Miller | ........................ 439/372 |

* cited by examiner

*Primary Examiner*—Jean F Duverne
(74) *Attorney, Agent, or Firm*—Wei Te Chung (57) ABSTRACT

A plug-in module (100) includes opposite sidewalls (11, 21) parallel to each other and extending along a longitudinal direction and a latch mechanism (8). The latch mechanism includes an actuating member (4) rotatably assembled to the sidewalls and a pair of ejectors (5). The actuating member includes a pair of actuating arms (42) each formed with an actuating end (43) at one distal end thereof, and an operating portion (41) across the sidewalls along a lateral direction perpendicular to the longitudinal direction and connecting the other distal ends of the pair of actuating arms. The pair of ejectors are rotatably assembled to the sidewalls to cooperate with the actuating ends of the actuating member. The actuating member is configured and arranged such that movement of the operating portion thereof in up-to-down direction results in down-to-upward movement of the actuating arms and the actuating ends to thereby actuate the ejectors outwardly rotate relative to the sidewalls adapted for deflecting the latch tab of the module receptacle to separate the plug-in module from the module receptacle. The actuating member includes a pair of elastic spring arms (4210) integrally formed with the actuating arms and being capable of being compressed with the movement of the actuating member in up-to-down direction and capable of providing elastic restore force to the actuating member to actuate the actuating member and the ejectors to their original positions.

18 Claims, 13 Drawing Sheets

PLUG-IN MODULE WITH IMPROVED LATCH MECHANISM

CROSS-REFERENCE TO RELATED APPLICATIONS

This application is related to and is a Continuation-In-Part (CIP) of U.S. patent application Ser. No. 11/897,904 filed on Aug. 31, 2007 and entitled "PLUG-IN MODULE WITH LATCH MECHANISM", both of which have the same applicant and assignee as the present invention.

BACKGROUND OF THE INVENTION

1. Field of the Invention

The present invention generally relates to a plug-in module, and more particularly to a plug-in module used for high-speed transmission.

2. Description of Related Art

SFP (Small Form-factor Pluggable), X-SFP and QSFP are all modules for fiber optic transmission or signal transmission. All of the modules are of small size or form factor which is important. The smaller the form factor of the module, the less space taken on a printed circuit board to which it couples. A smaller form factor allows a greater number of modules to be coupled onto a printed circuit board to support additional communication channels. However, the smaller form factor makes it more difficult for a user to handle.

When such a module embedded in a system fails, it is desirable to replace it, particularly when other communication channels are supported by other modules. To replace a failed module, it needs to be pluggable into a module receptacle. While, plugging in a new module is usually easy, it is more difficult to remove the failed module because of other components surrounding it. Additionally, a user should not attempt to pull on cables of the module in order to try and remove a failed module or else the user might cause damage thereto.

A typical release method for a pluggable module is to push in on the module itself and then pull out on the module to release it from a cage assembly or module receptacle. It has been determined than this method is not very reliable with users complaining of the difficulty in removing pluggable modules in such manner. Users often complain that traditional methods offer little leverage in getting a sufficient grip on the module when attempting to pull it out of a module receptacle. Another complaint is that traditional actuators used to remove modules are inaccessible or invisible. Other users complain than once released by the traditional method, it is difficult to withdraw the module out of its cage or module receptacle.

Therefore, designers developed different solutions to solve above problems accounted by the users, such as disclosed by U.S. Pat. Nos. 6,851,867, 6,749,448, 6,884,097, 6,908,323, 7,052,306, 6,824,416 and 7,090,523. The theories of theses patents are substantially the same, that is each module is received in corresponding cage or module receptacle and comprises a pair of sliders with forward ends engaging with tabs of the cage, and a bail or lever capable of rotating to actuate the sliders linearly to separate forward ends of the sliders from the tabs. The action theory of theses patents successfully solve the problems mentioned above. However, the latch mechanisms disclosed above all need springs to serve as spring back means to actuate the latch mechanisms to return to original positions. Further, the plug-in modules are arranged side by side to mate with module receptacles. There is little space left for operator to pull bail or levers to separate the plug-in modules from the module receptacles. The present invention provides a plug-in module with an improved latch mechanism operating in a theory different from that of these patents while still successfully solving the problems and with self spring back function and an additional pull tape.

BRIEF SUMMARY OF THE INVENTION

Accordingly, an object of the present invention is to provide a plug-in module with a latch mechanism having enough elasticity for unplugging the plug-in module conveniently.

Another object of the present invention is to provide a plug-in module having an improved latch mechanism with an additional pull tape for unplugging the plug-in module conveniently.

In order to achieve the above-mentioned object, a plug-in module configured for latching engagement with a module receptacle adapted for mounting to a printed circuit board comprises opposite sidewalls parallel to each other and extending along a longitudinal direction parallel to a mating direction of the plug-in module and a latch mechanism. The latch mechanism comprises an actuating member rotatably assembled to the sidewalls and a pair of ejectors. The actuating member comprises a pair of actuating arms each formed with an actuating end at one distal end thereof, and an operating portion across the sidewalls along a lateral direction perpendicular to the longitudinal direction and connecting the other distal ends of the pair of actuating arms. The pair of ejectors are rotatably assembled to the sidewalls to cooperate with the actuating ends of the actuating member. The actuating member is configured and arranged such that movement of the operating portion thereof in up-to-down direction results in down-to-upward movement of the actuating arms and the actuating ends to thereby actuate the ejectors outwardly rotate relative to the sidewalls adapted for deflecting the latch tab of the module receptacle to separate the plug-in module from the module receptacle. The actuating member comprises a pair of elastic spring arms integrally formed with the actuating arms and being capable of being compressed with the movement of the actuating member in up-to-down direction and capable of providing elastic restore force to the actuating member to actuate the actuating member and the ejectors to their original positions.

Other objects, advantages and novel features of the invention will become more apparent from the following detailed description of the present embodiment when taken in conjunction with the accompanying drawings.

DETAILED DESCRIPTION OF THE INVENTION

Reference will now be made to the drawing figures to describe the present invention in detail.

Figure 1:
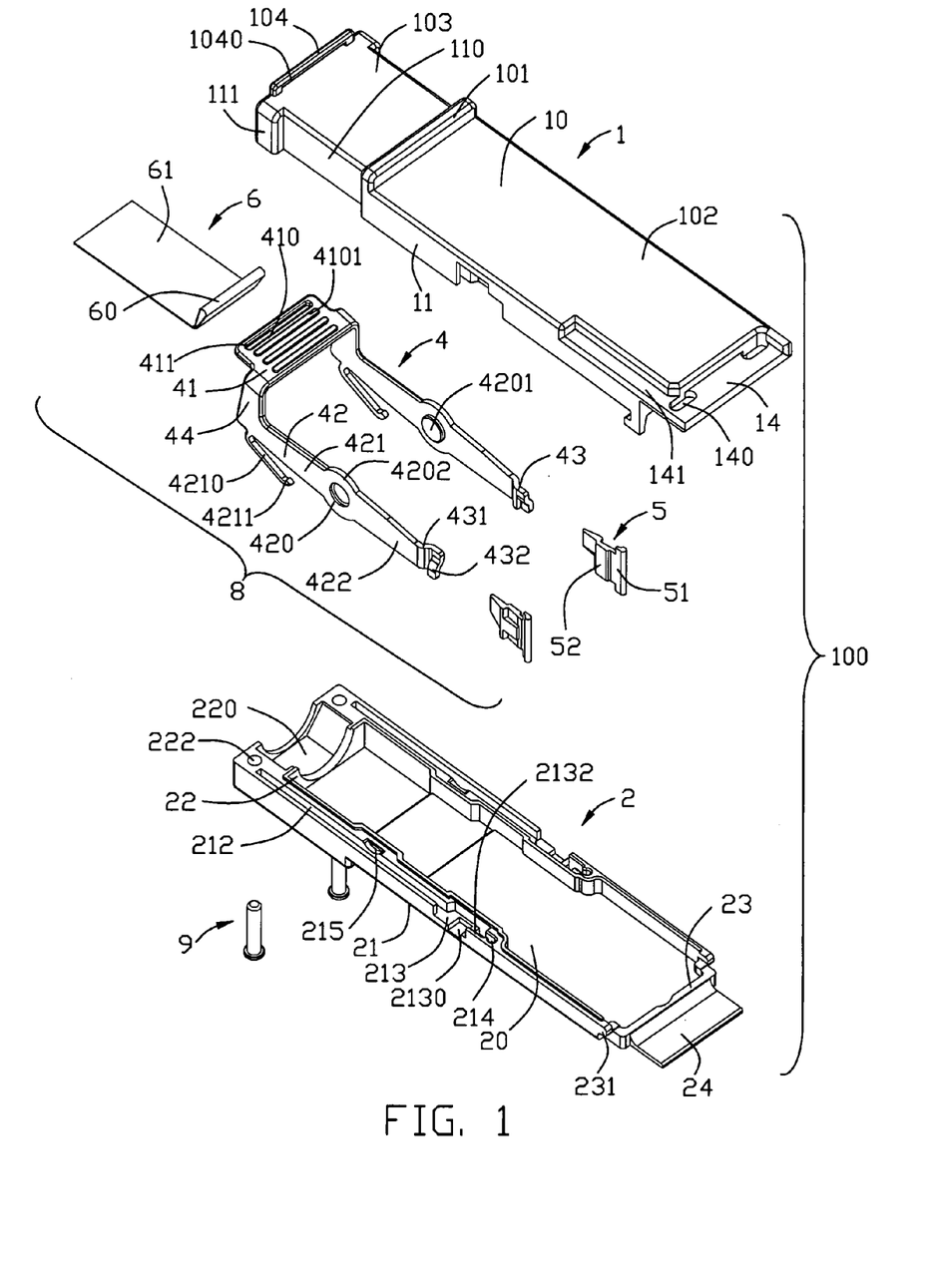
FIGS. 1-3 are exploded, perspective views of a plug-in module in accordance with the present invention and viewed from different aspects.
Figure 2:
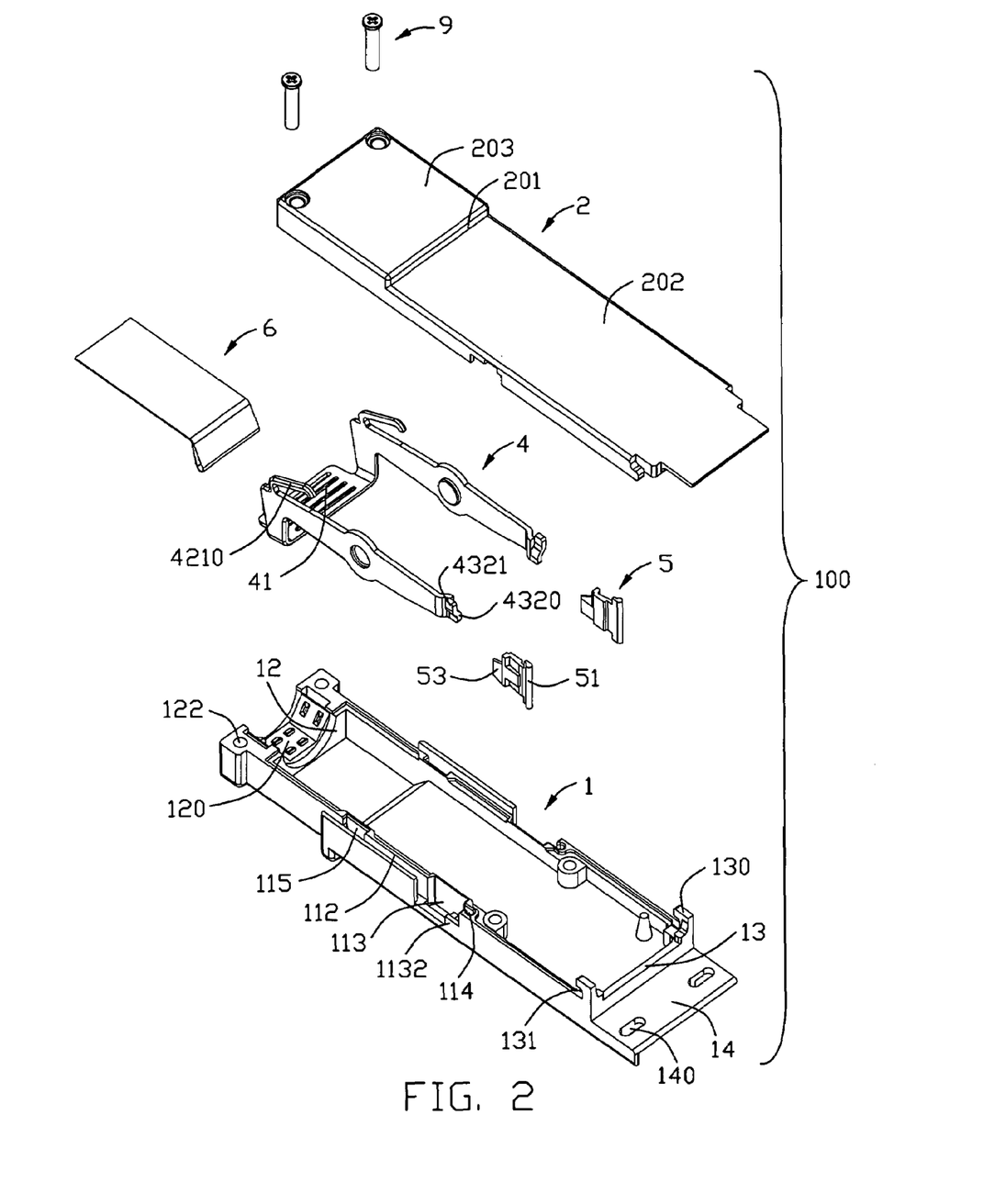
Figure 3:
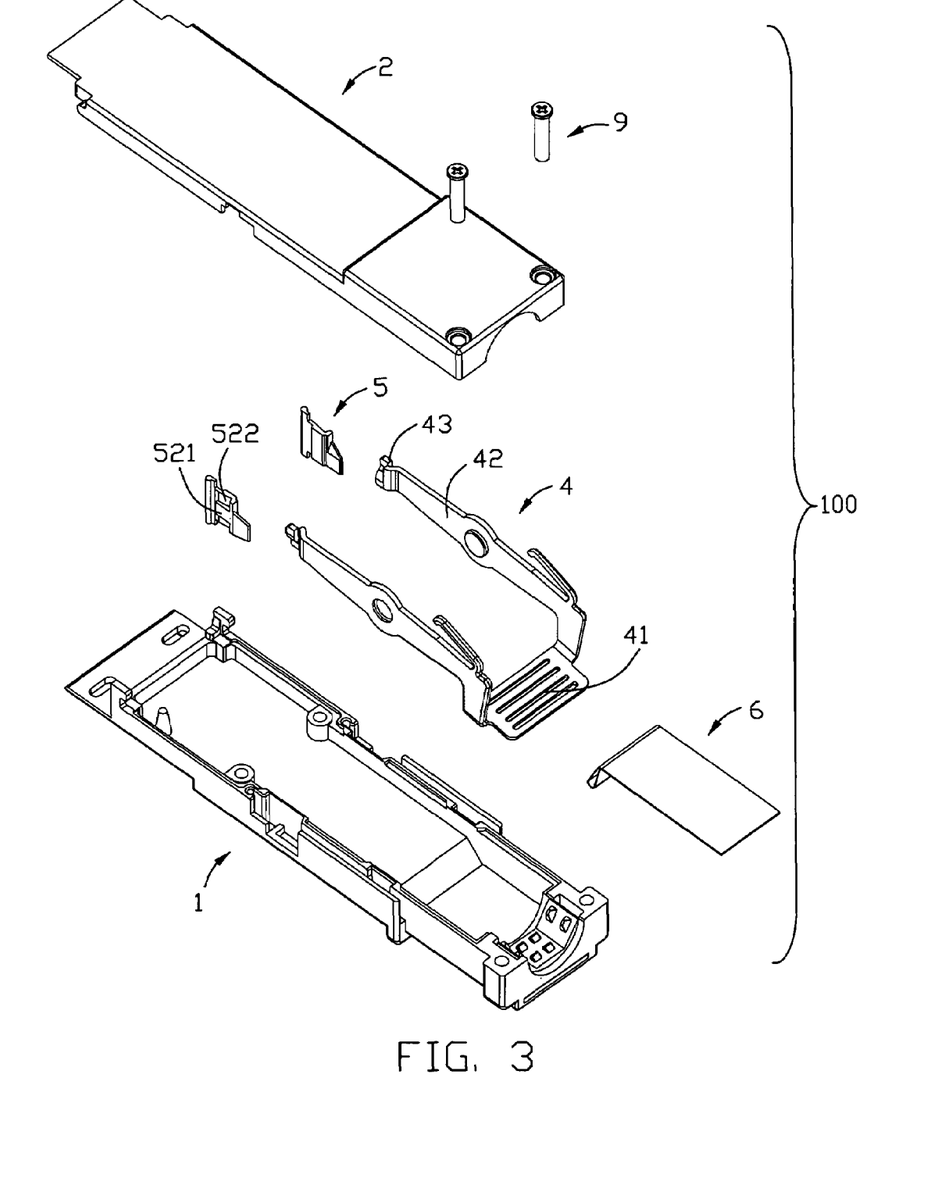

Referring to FIGS. 1-3, a plug-in module 100 in accordance with the present invention comprises a base 2, a cover 1 assembled with the base 2 to form a die cast housing 7, a self-springback latch mechanism 8 assembled to the base 2 and the cover 1 for unplugging the plug-in module 100 from a module receptacle (not shown) conveniently, and a pull tape 6 assembled to the latch mechanism 8 and the cover 1 for separating the plug-in module 100 from a module receptacle. The latch mechanism 8 comprises a metal actuating member 4 assembled to the base 2 and the cover 1, and a pair of die-cast ejectors 5 assembled to the base 2 and the cover 1 and capable of being actuated by the actuating member 4. In the preferred embodiment, the plug-in module 100 is a QSFP (Quad Small Form-factor Pluggable) module in accordance with Revision 1.0 of the QSFP Transceiver specification released on Dec. 1, 2006. However, the plug-in module 100 also can be other types of modules without betray the spirit of the present invention.

The cover 1 comprises a step-shape main upper wall 10, a pair of first sidewalls 11 extending downwardly from opposite side edges of the upper wall 10, opposite first front and rear walls 13, 12 with different heights downwardly extending from front and rear edges of the upper wall 10 and connecting with the pair of first sidewalls 11. The upper wall 10 extends forwardly beyond the first front wall 13 to form a first front flange 14 with a pair of elliptical holes 140 laterally arranged. An L-shape cutout 141 recesses downwardly from upper surface of the upper wall 10 and locates at a left corner of the upper wall 10. A first flange 101 is formed on the upper wall 10 to divide the cover 1 into a front first mating section 102 and a rear first installation section 103 which is higher and shorter than the first mating section 102 but lower than the first flange 101. The first flange 101 indicates the final insertion position of the plug-in module 100.

The first installation section 103 defines a pair of cutouts 110 recessed inwardly from opposite first sidewalls 11 to form a pair of block sections 111 connecting with the first rear wall 12. A protrusion 104 is formed on the upper surface of the upper wall 10 and locates adjacent to rear edge of the upper wall 10. A slit 1040 is defined through the protrusion 104 along front-to-back direction, and functions as a restriction and guiding means. A first accommodating slot 112 is defined in each first sidewall 11 and extends along the front-to-back direction. A first pivot recess 115 locates adjacent to the first flange 101 and recesses inwardly from the first sidewall 11 and communicates with the first accommodating slot 112. A semi-circular first rail recess 1120 is recessed upwardly from the first accommodating slot 112 and aligned with the first pivot recess 115 along transverse direction. A first cooperating recess 113 is recessed inwardly from forward end of the first accommodating slot 112 and opens toward outside. A circular first pivot hole 114 recesses upwardly from the first sidewall 11 and communicates with the first cooperating recess 113.

The first rear wall 12 has a relatively large thickness along mating direction and defines a first semicircular exit opening 120 for the exit of a cable (not shown). A pair of first fastening holes 122 are defined in the ear sections 111 to locate at opposite sides of the exit opening 120. A pair of tips 130 are formed at two corners of the first front wall 13 and below the first front wall 13 to form a pair of spaces 131 between the bottom surfaces of the first sidewalls 11.

The base 2 comprises a step-shape bottom wall 20, a pair of second sidewalls 21 extending upwardly from opposite side edges of the bottom wall 20, opposite second front and rear walls 23, 22 upwardly extending from front and rear edges of the bottom wall 20 and connecting with the pair of second sidewalls 21.

The bottom wall 20 comprises a front second mating section 202 and a rear second installation section 203 lower than the second mating section 202 to form a second flange 201 therebetween for indicating the final insertion position of the plug-in module 100 together with the first flange 101. The second rear wall 22 has a relatively large thickness along the mating direction and partially cut to form a semicircular second exit opening 220 which cooperates with the first exit opening 120 to form an exit channel 70 (FIG. 4) for the exit of the cable (no shown). The second rear wall 22 also defines a pair of circular second fastening holes 222 at opposite sides of the second exit opening 220 corresponding to the first fastening holes 122 for a pair of screws 9 protruding therethrough to fasten the base 2 with the cover 1. The bottom wall 20 extends beyond the second front wall 23 to form a second front flange 24 parallel spaced from the first front flange 14 with a front end of a printed circuit board (not shown), which is accommodated between the base 2 and the cover 1, exposed between the front flanges 14, 24.

Figure 6:
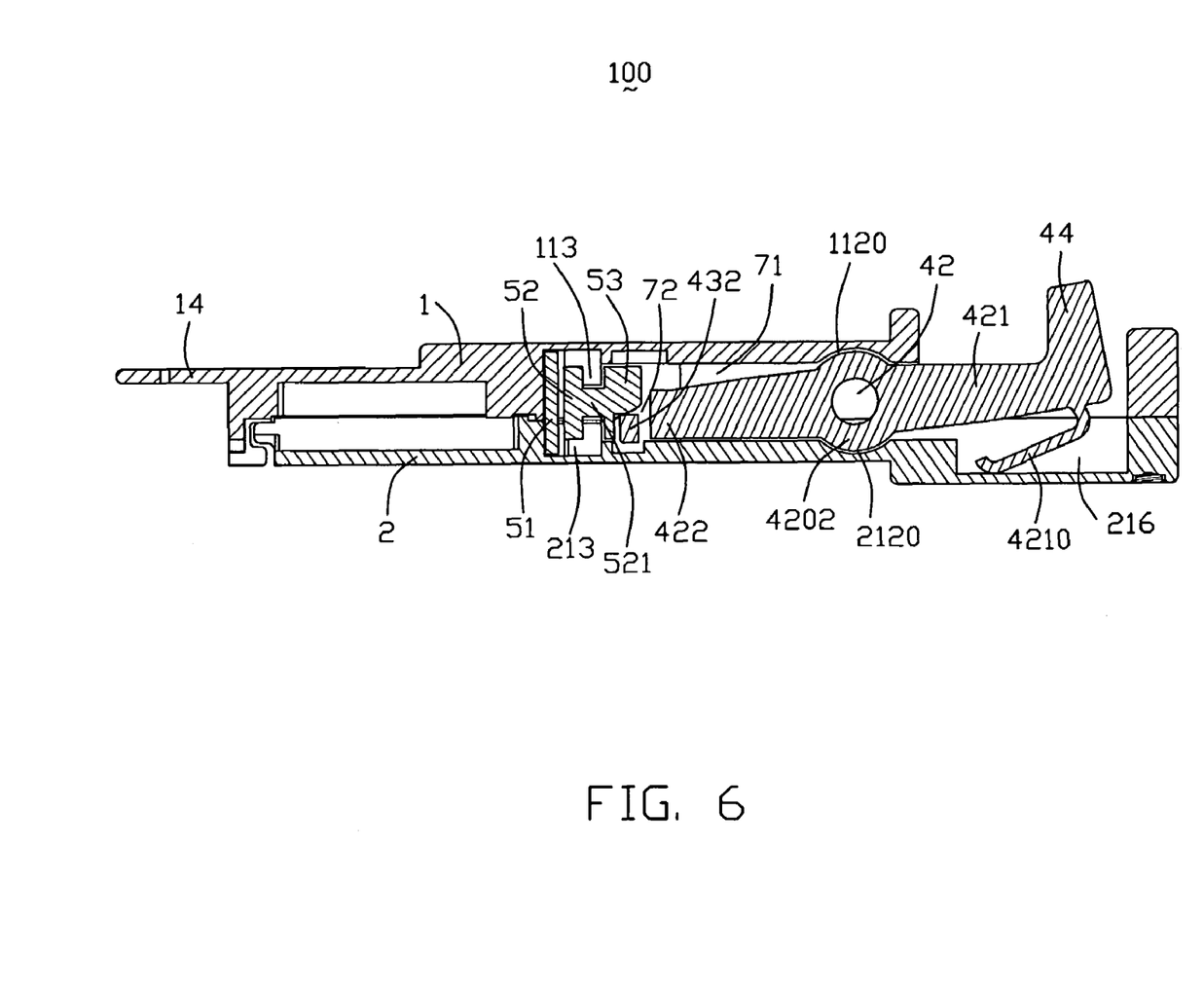
FIGS. 6-8 are cross-section views taken along lines 6-6 to 8-8 of FIG. 4.
Figure 7:
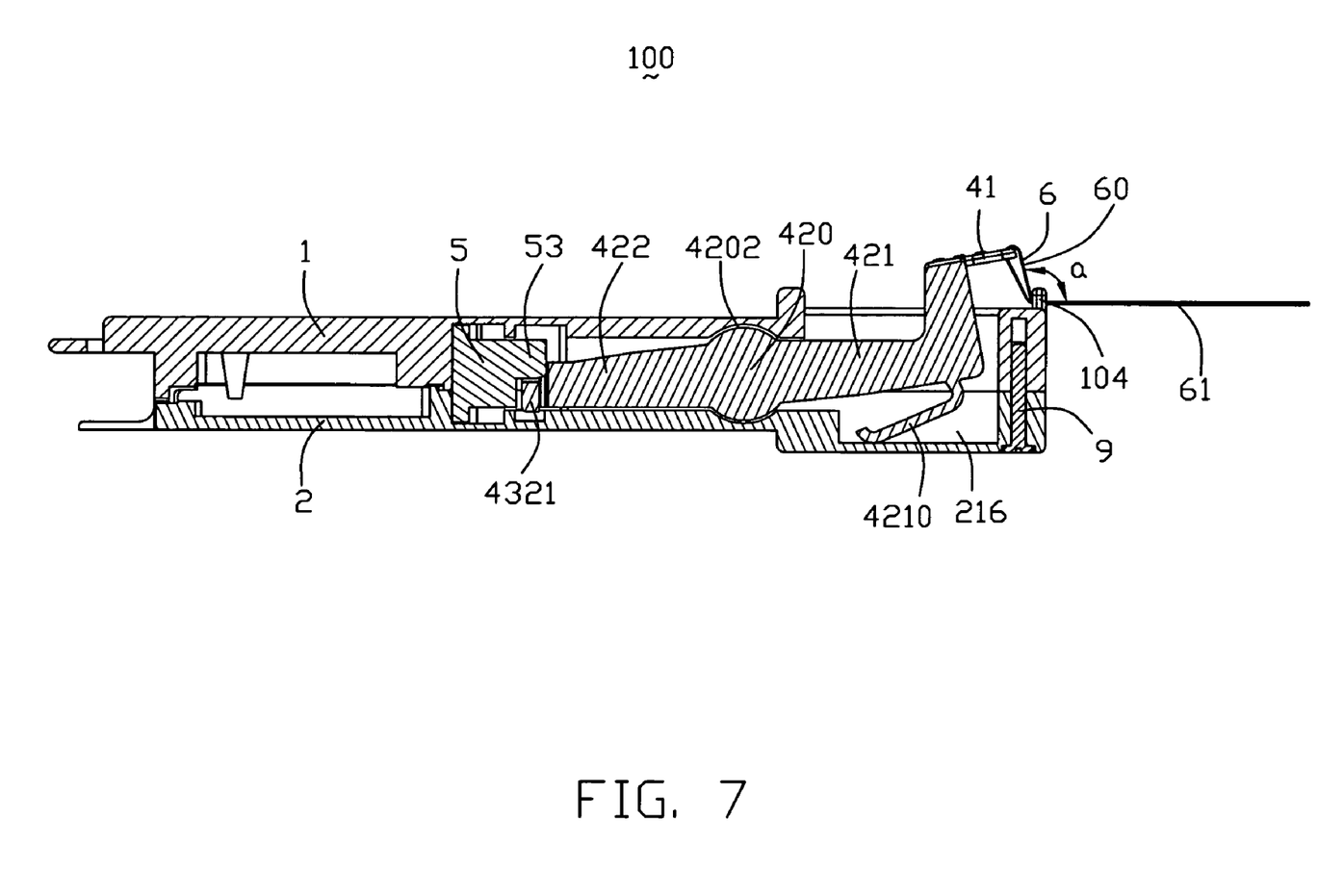
Figure 8:
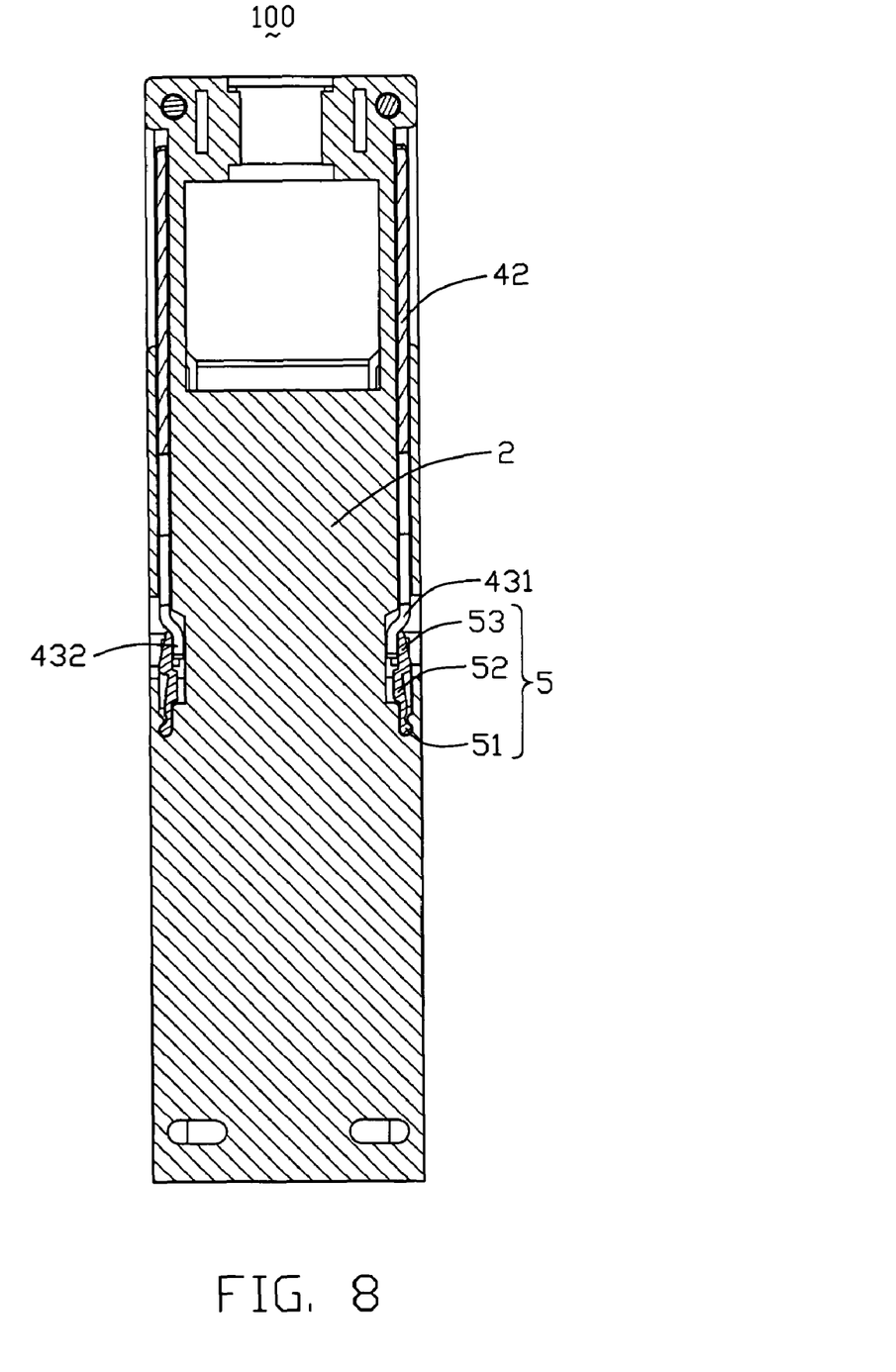
Figure 9:
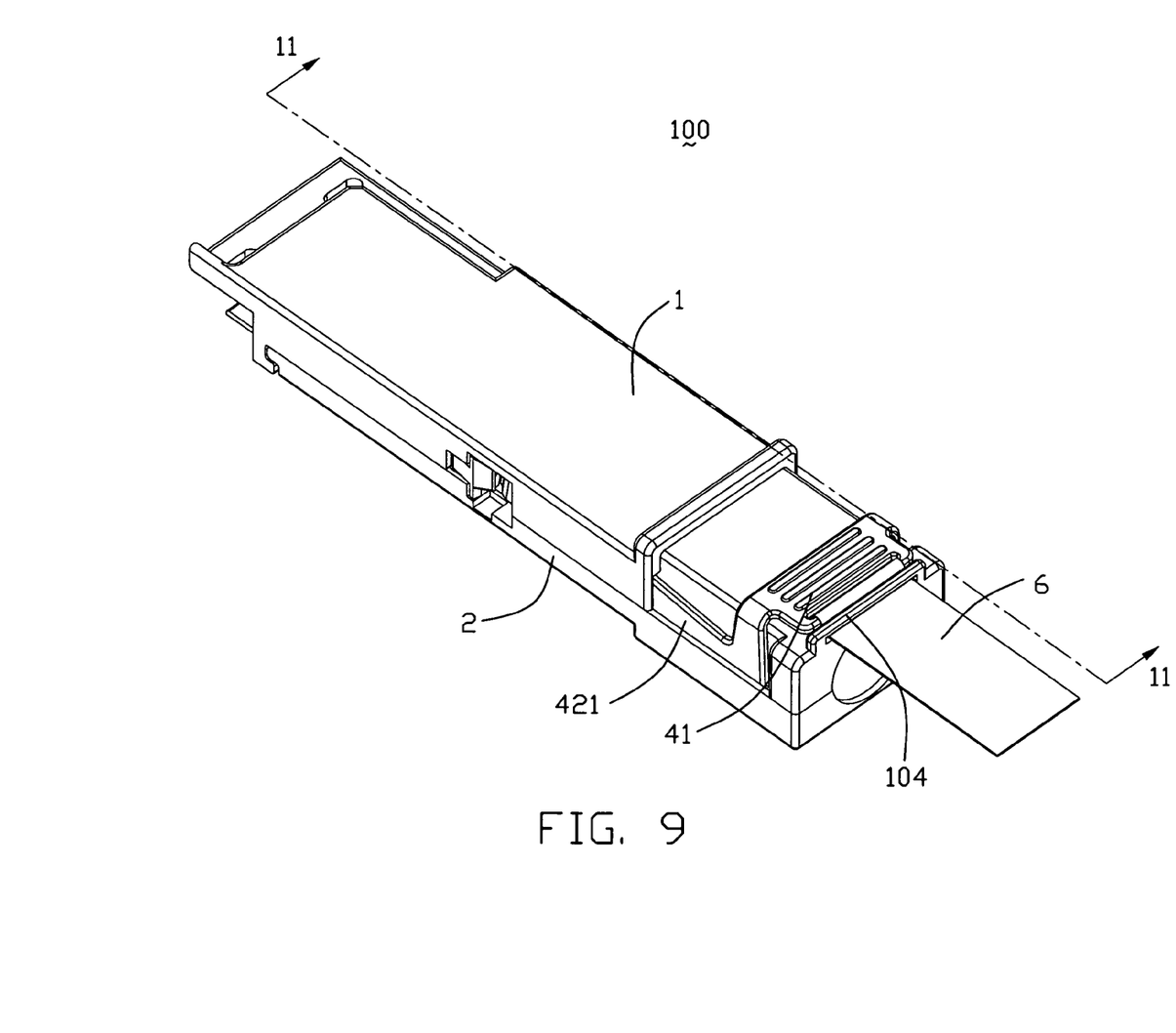
FIGS. 9-10 are assembled views of the plug-in module, viewed from different aspects and with the latch mechanism in use state.
Figure 10:
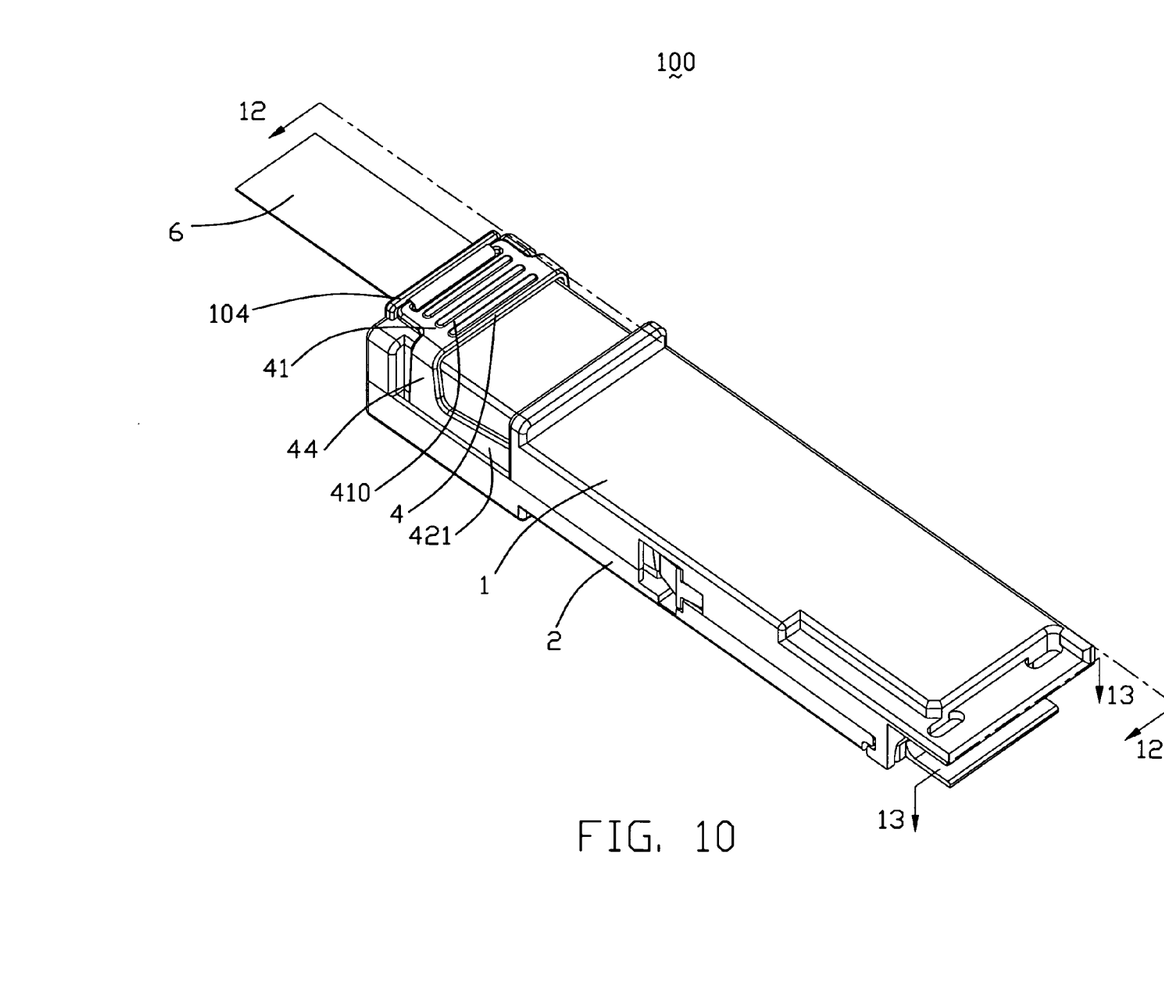
Figure 11:
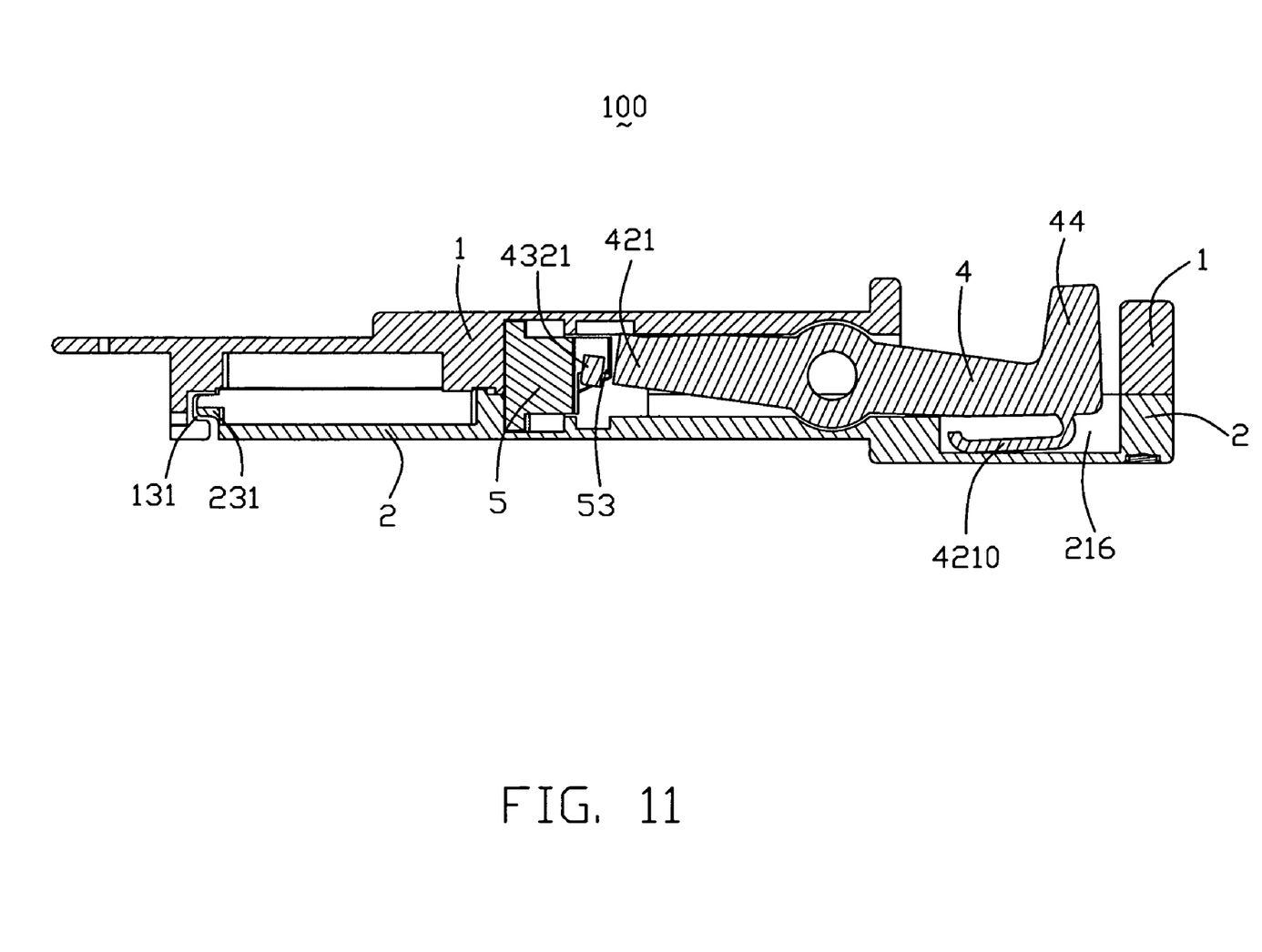
FIGS. 11-13 are cross-section views taken along lines 11-11 to 13-13 of FIG. 9.
Figure 12:
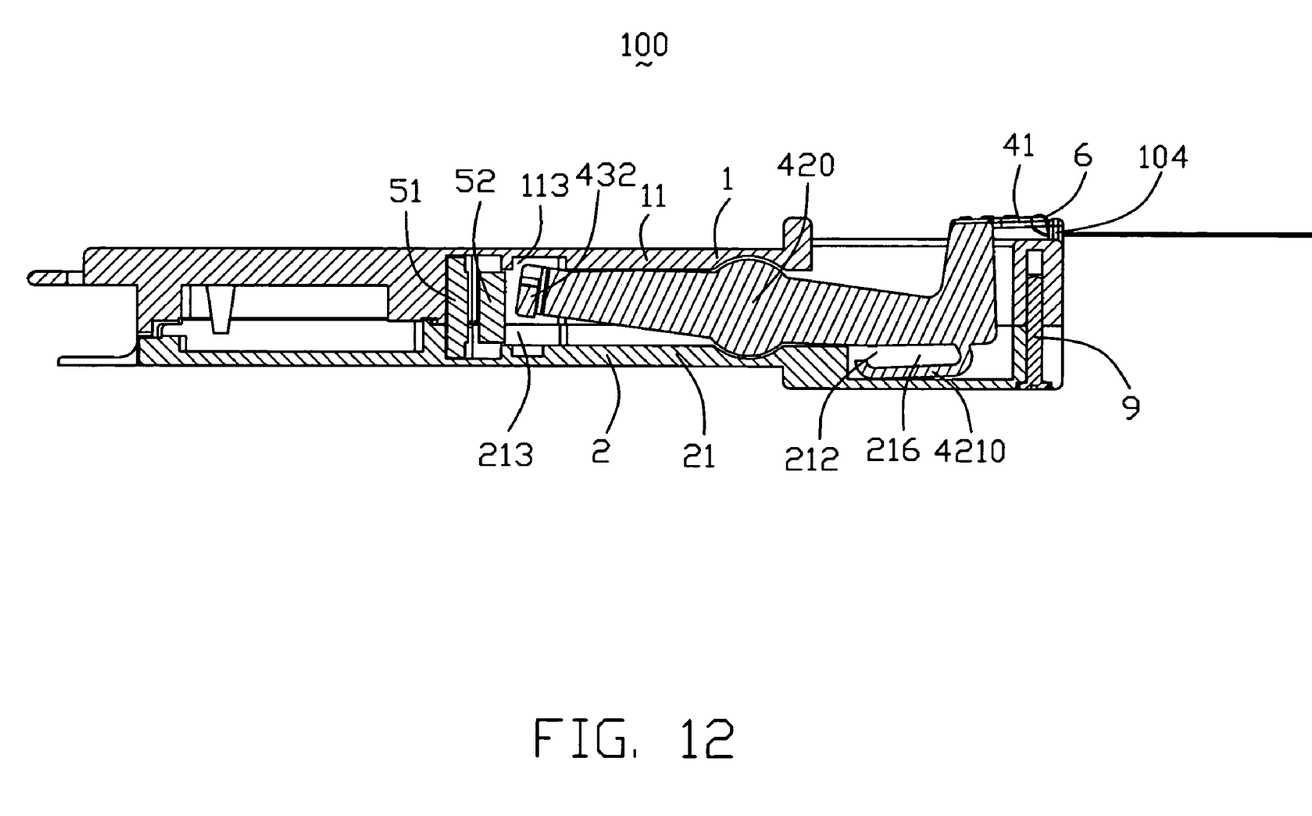
Figure 13:
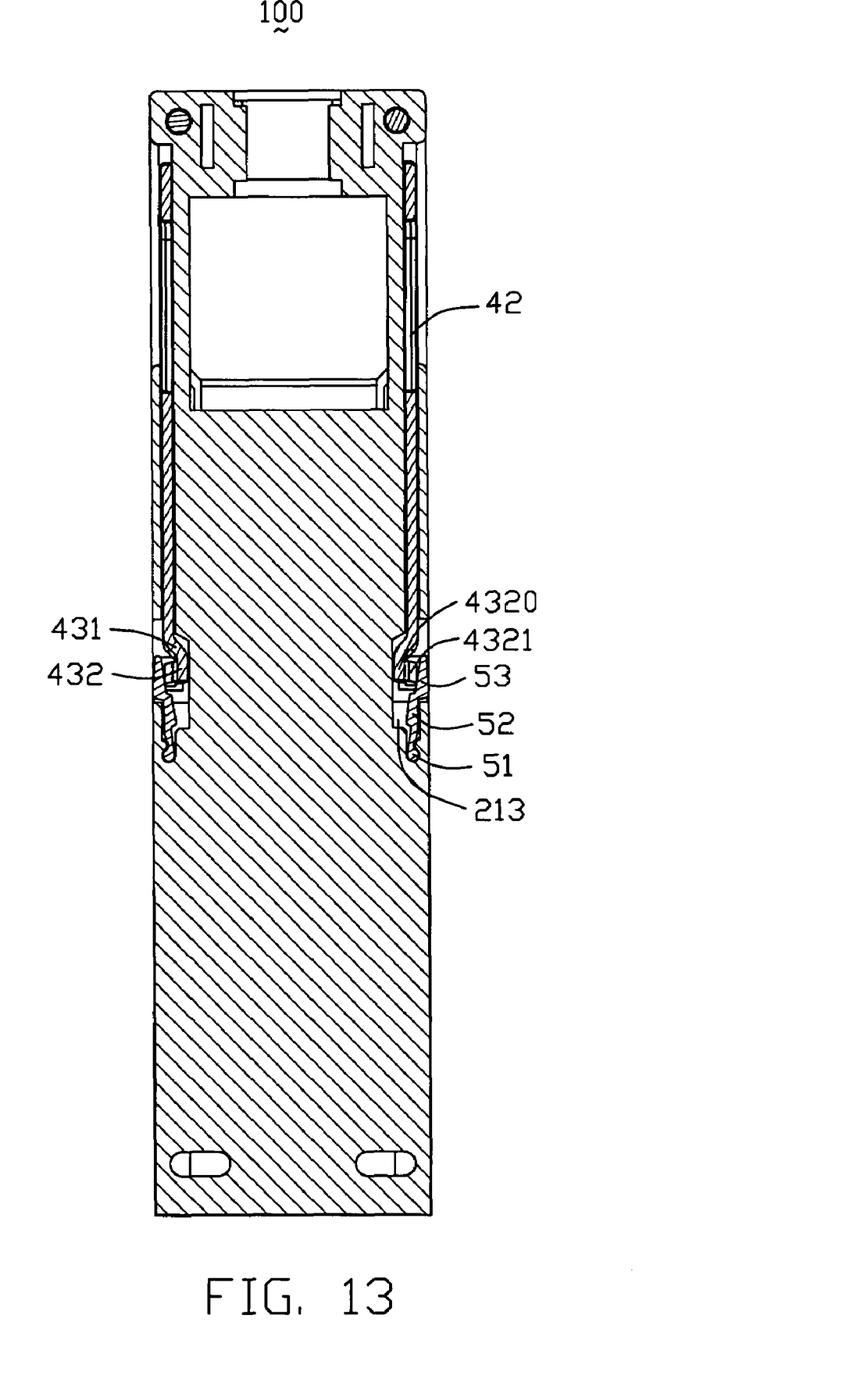

Each second sidewall 21 defines a second accommodating slot 210 which recess downwardly therein corresponding to the first accommodating slot 112 of the cover 1 to corporately form an accommodating channel 71 (FIG. 6) of the plug-in module 100 to receive the actuating member 4. A deeper receiving slot 216 (FIG. 6) adjacent to the second rear wall 22 recesses downwardly into the second sidewall 21 and communicates with the second accommodating slot 212. A second pivot recess 215 is recessed inwardly from inner part of second sidewall 22 corresponding to the first pivot recess 115. Particularly, the first pivot recess 115 is deeper than the second pivot recess 215, that is to say, the angle of the first pivot recess 115 is larger than that of the second pivot recess 215. A second rail recess 2120 is recessed downwardly from the second accommodating slot 212 to form a whole circle together with the first rail recess 1120 to receive a spindle 4201 of the actuating member 4. A front second cooperating recess 213 corresponding to the first cooperating recess 113 is defined in the second sidewall 21 and communicates with the second accommodating slot 212. A second pivot hole 214 is defined in the second sidewall 21 corresponding to the first pivot hole 114 and communicates with the second cooperating recess 213. A pair of tips 231 extends forwardly from forward ends of the pair of second sidewalls 21 and locates above the second front wall 23. Further, a U-shape opening 2130 opens toward outside and is recessed downwardly in the second sidewall 22 and communicates with the second cooperating recess 213.

The actuating member 4 is assembled to the base 2 and the cover 1 to actuate the ejectors 5 outwardly move. The actuating member 4 comprises a flat operating portion 41, a pair of vertical connecting portions 44 extending downwardly from opposite sides of the operating portion 41, a pair of actuating arms 42 extending forwardly from opposite lower ends of the connecting portions 44. The operating portion 41 comprises an extrusion section 410 extending rearwardly therefrom and formed a plurality of ribs 4101 thereon for facilitating the operation of the user. A through slot 411 is defined in the extrusion section 410 adjacent to rear edge of the extrusion section 410. Each actuating arm 42 is of spindly shape, that is to say, the actuating arm 42 comprises a wider middle section 420 and a pair of narrower opposite front and rear ends 421,

422. A pair of arc-shape protuberances 4202 protrude outwardly from upper and lower edges of the middle section 420 to cause the middle section 420 a column shape. The column-shape spindle 4201 protrudes from inner surface of one middle section 420 of the actuating arm 42 toward the other middle section 420 of the actuating arm 42. An elastic spring arm 4210 downwardly and slantly extends from front and lower end of the front end 421 to form a sharp angle between the spring arm 4210 and the lower edge of the front end 421. An actuating end 43 is formed at distal end of the rear end 422 of each actuating arm 42. The actuating end 43 comprises a curved connecting section 431 curved inwardly from corresponding rear end 422, and an elastic spring section 432 connecting with the connecting section 431. Each spring section 432 comprises an upper section 4320 connecting with the connecting section 431 and a curved lower actuating section 4321 curved outwardly from the upper section 4320. In addition, the actuating member 4 in the preferred embodiment of the present invention is stamped from metal material which is more elastic in operation than an actuating member die casted from metal material and has lower cost compared with die cast process.

The pair of ejectors 5 are assembled to the base 2 and the cover 1 to be actuated by the actuating member 4 for releasing the plug-in module 100 from the module receptacle. Each ejector 5 is die casted from metal material and comprises a front pivot 51 vertically arranged for being received in the first and second pivot holes 114, 214, a main portion 52 extending rearwardly from the pivot 51, and a tapered cooperating end 53 formed with upper end of the main portion 52. Outer and lower surfaces of the cooperating end 53 are tapered. The main portion 52 comprises an inner surface and an opposite outer surface. The inner surface of the main portion 52 is partially cutout to form a bridge 521 and a pair of wedge-shape cutouts 522 above and below the bridge 521.

The pull tape 6 is a belt and made from insulative material.

Figure 4:
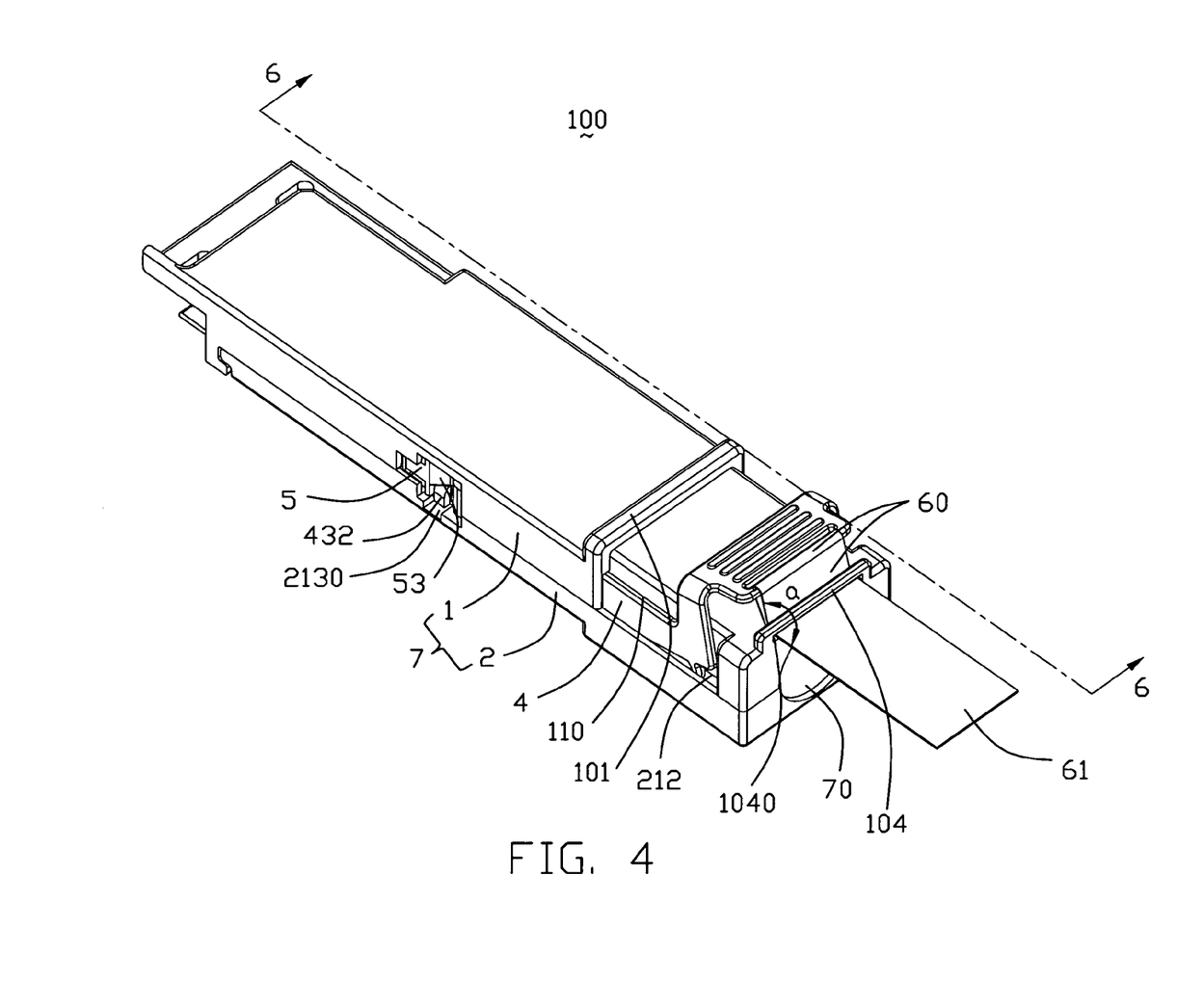
FIGS. 4-5 are assembled views of the plug-in module, viewed from different aspects and with latch mechanism in release state.
Figure 5:
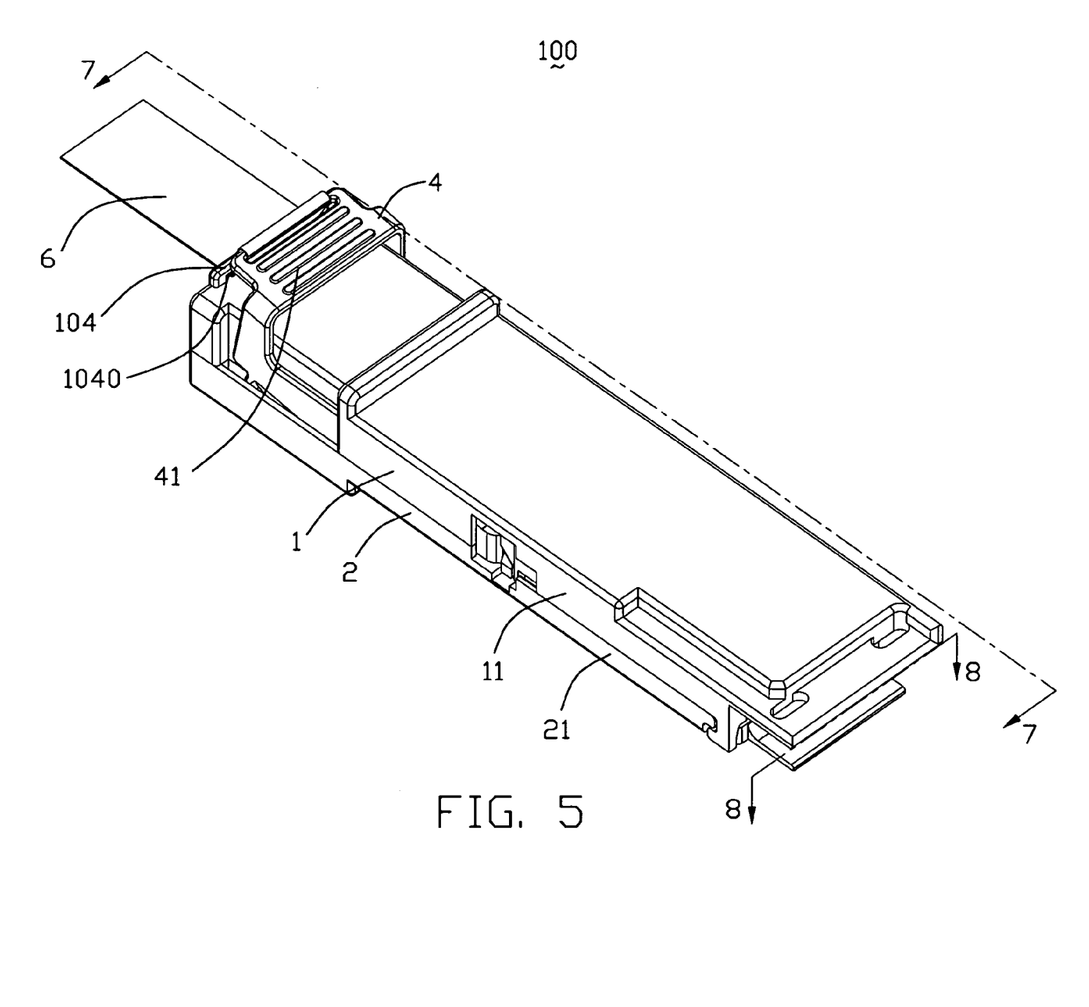

In assembly, referring to FIGS. 4-5 in conjunction with FIGS. 1-2 and 6-9, the pull tape 6 is firstly assembled to the actuating member 4. The pull tape 6 protrudes through the through slot 411 of the operating portion 41 of the actuating member 4 with opposite ends are sticked to each other to form a rear pulling portion 61 and a front surrounding portion 60. Then the actuating member 4 with the pull tape 6 and the ejectors 5 are assembled to the cover 1.

The actuating member 4 is assembled to the cover 1 along down-to-up direction with the pulling portion 61 of the pull tape 6 protruding through the slit 1040 of the cover 1. The operating portion 41 locates above the cover 1 and upper portions of the pair of actuating arms 42 occupy the first accommodating slots 112. The pair of upper protuberances 4202 are respectively rotatably received in the pair of first pivot recesses 115 and upper sections of the pair of spindles 4201 are rotatably received in the pair of first rail recesses 1120 of the pair of first sidewalls 11. The upper sections of the actuating ends 43 are received in the first cooperating recesses 113. The ejectors 5 are assembled to the cover 1 with the pivots 51 inserted into the first pivot holes 114 and the main portions 52 and the cooperating ends 53 occupying the left spaces of the first cooperating recesses 113. In such circumstances, the actuating section 4321 of the spring section 432 of the actuating end 43 is located below the cooperating end 53 with flat inner surface of the actuating end 43 attaching to an outer surface of the upper section 4320 of the spring section 432. An L-shape second step 1132 occupies the wedge-shape cutout 522 to abut against the bridge 521.

The base 2 is then assembled to the cover 1, the actuating member 4 and the ejectors 5 together with the pull tape 6 with the pair of tips 231 inserted into the spaces 131 of the cover 1 then rotating the base 2 a certain angle to combine the base 2 and the cover 1 into the housing 7. The lower sections of the actuating arms 42, the actuating ends 43 and the ejectors 5 occupy the second accommodating slots 212, the second cooperating recess 213 and the second pivot hole 214 in a manner similar to the assembly described above. The lower protuberances 4202 are rotatably received in the second pivot recesses 215 and lower sections of the pair of spindles 4201 are rotatably received in the second rail recesses 2120. The lower sections of the actuating ends 43 are received in the second cooperating recesses 213. The lower sections of the pivots 51 are inserted into the second pivot holes 214. While, the lower sections of the main portions 52 and the cooperating ends 53 occupy the left spaces of the second cooperating recesses 213. An L-shape second step 2132 occupies the wedge-shape cutout 522 to abut against the bridge 521. The spring arms 4210 are received in the receiving slots 216 of the base 2. Further, in FIGS. 4-8, the spring arms 4210 are in release state and only distal curved ends 4211 thereof elastically abut against bottom surfaces of the receiving slots 216 and the operating portion 41 of the actuating member 4 locates above top surface of the cover 1. While, the pull tape 6 thus forms an obtuse angle a between the pulling portion 61 and the surrounding portion 60. After such assembly, referring to FIGS. 6-7, since the spindly shape of the actuating arms 42, only the wider middle sections 420 of the actuating arms 42 are sandwiched by the first and second sidewalls 11, 21. That is to say, the rear ends 422 of the actuating arms 42 has some distance to the first sidewalls 11 which serves as operating space for the operating portion 41, and the front ends 421 of the actuating arms 42 and the actuating ends 43 has some distances to the first and second sidewalls 11, 21 which serve as operating spaces for the actuating ends 43.

After the above assembly, the plug module 100 is achieved. The first and second accommodating slots 110, 210 corporately form the accommodating channel 71 of the housing 7 to receive the actuating member 4, and the first and second cooperating recesses 113, 213 corporately form a cooperating space 72 (FIG. 6) of the housing 7 which is commonly used by the actuating member 4 and the ejectors 5. When removing the plug-in module 100 from the module receptacle, please refer to FIGS. 9-13, operator may exerts a rearward force to the pulling portion 61 of the pull tape 6 or exerts a downward force to the operating portion 41 of the actuating member 4 to actuate the actuating member 4 rotating along counterclockwise direction to actuate the ejectors 5 outwardly move to separate from tabs of the module receptacle, thus, the plug-in module 100 separates from the module receptacle. In one hand, when the operator rearwardly pull the pulling portion 61 of the pull tape 6, with the rearward movement of the pull tape 6, the operating portion 41 of the actuating member 4 is pulled toward the upper surface of the cover 1 to compress the elastic spring arm 4210 downwardly move toward the bottom surface of the receiving slot 216, until rear end of the operating portion 41 abuts against the protrusion 104 of the cover 1 with the pull tape 6 is sandwiched by the protrusion 104 and the operating portion 41. In such circumstance, the protuberances 4202 and the spindles 4201 respectively rotate along counterclockwise direction in the first and second pivot recesses 115, 215 and first and second rail recesses 1120, 2120. Thus, the actuating ends 43 upwardly move with the actuating sections 4320 sliding along slanted lower surfaces of the cooperating ends 53 to cause the outward movement of the cooperating ends 53 with the pivots 51 rotating in the first and second pivot holes 114, 214. In the other hand, the operator directly downwardly press the operating portion 41 of the actuating member 4, the actuating member 4 operates in the same process as described above. After the plug-in module 100 is separated from the module receptacle, the operator may release the force exerted to the pull tape 6 or the operating portion 41 of the actuating member 4, the spring arms 4210 in compressed state may upwardly move to actuate the actuating member 4 operate in a process contrary to the process described above. Therefore, the actuating member 4 is actuated to its original release state as shown in FIGS. 4-8.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A plug-in module configured for latching engagement with a module receptacle adapted for mounting to a printed circuit board, comprising:
   opposite sidewalls parallel to each other and extending along a longitudinal direction parallel to a mating direction of the plug-in module; and
   a latch mechanism comprising:
   an actuating member rotatably assembled to the sidewalls and comprising a pair of actuating arms each formed with an actuating end at one distal end thereof, and an operating portion across the sidewalls along a lateral direction perpendicular to said longitudinal direction and connecting the other distal ends of the pair of actuating arms; and
   a pair of ejectors rotatably assembled to the sidewalls to cooperate with the actuating ends of the actuating member; and wherein
   the actuating member is configured and arranged such that movement of the operating portion thereof in up-to-down direction results in down-to-upward movement of the actuating arms and the actuating ends to thereby actuate the ejectors outwardly rotate relative to the sidewalls deflecting the latch tab of the module receptacle to separate the plug-in module from the module receptacle; and wherein
   the actuating member comprises a pair of elastic spring arms integrally formed with the actuating arms and being compressed with the movement of the actuating member in up-to-down direction and providing elastic restore force to the actuating member to actuate the actuating member and the ejectors to their original positions.

2. The plug-in module as claimed in claim 1, wherein the pair of spring arms of the actuating member forwardly and downwardly extend from lower edges of the actuating arms to form sharp angles with the lower edges of the actuating arms.

3. The plug-in module as claimed in claim 1, wherein the rotating direction of the actuating member is different from that of the ejectors.

4. The plug-in module as claimed in claim 1, wherein a spindle is formed with at least one of each actuating arm and each sidewall, and a pivot recess is defined in at least one of each sidewall and each actuating arm, and wherein the spindle is rotatably received in the pivot recess to serve as a pivot of the actuating member.

5. The plug-in module as claimed in claim 1, wherein each ejector comprises a pivot arranged in a vertical direction and a cooperating end extending from the pivot toward the actuating member, and wherein the cooperating ends of the pivots cooperate with the actuating ends of the actuating member.

6. The plug-in module as claimed in claim 5, wherein the cooperating end of each pivot is located above corresponding actuating end of the actuating member, and wherein the actuating ends of the actuating member has an elastic lower section curved outwardly and being arranged to be capable of sliding along the cooperating end along up-to-down direction to actuate the pivot outwardly move.

7. The plug-in module as claimed in claim 1, wherein the sidewalls are first and second sidewalls combined together along vertical direction, and wherein the first and second sidewalls respectively define a pair of first and second accommodating slots to receive the actuating arms of the actuating member.

8. The plug-in module as claimed in claim 7, wherein the second sidewall defines a pair of receiving slots communicating with the second accommodating slots, and wherein the spring arms of the actuating member are respectively received in the receiving slots.

9. The plug-in module as claimed in claim 7, wherein each sidewall further defines a pivot hole, and a cooperating space communicating with the accommodating slot and the pivot hole, and wherein the ejector forms a pivot rotatably received in the pivot hole and a cooperating end received in the cooperating space to contact the actuating end of the actuating arm.

10. The plug-in module as claimed in claim 1, further comprising a base and a cover respectively comprising first and second sidewalls, and wherein the actuating member and the ejectors are respectively rotatably attached to the first and second sidewalls of the base and the cover.

11. The plug-in module as claimed in claim 10, wherein the operating portion of the actuating member is located above cover and capable of move toward the cover.

12. The plug-in module as claimed in claim 10, wherein the base, the cover, and the ejectors are all die cast from metal material, and wherein the actuating member is stamped from metal material.

13. The plug-in module as claimed in claim 1, wherein the plug-in module is in accordance with QSFP (Quad Small Form-factor Pluggable) module standard.

14. A plug-in module configured for latching engagement with a module receptacle mounting to a printed circuit board, comprising:
   opposite sidewalls parallel to each other and extending along a longitudinal direction parallel to a mating direction of the plug-in module;
   an actuating member rotatably assembled to the sidewalls and comprising a pair of actuating arms each formed with an actuating end at one distal end thereof, and an operating portion across the sidewalls along a lateral direction perpendicular to said longitudinal direction and connecting the other distal ends of the pair of actuating arms;
   a pair of ejectors rotatably assembled to the sidewalls to cooperate with the actuating ends of the actuating member; and
   a pull tape at least assembled to the actuating member; and wherein
   the pull tape and the actuating member are configured and arranged such that the rearward movement of the pull tape results in the movement of the operating portion thereof in up-to-down direction, and down-to-upward movement of the actuating arms and the actuating ends to thereby actuate the ejectors outwardly rotate relative to the sidewalls deflecting the latch tab of the module receptacle to separate the plug-in module from the module receptacle.

15. The plug-in module as claimed in claim 14, further comprising a housing having said sidewalls and an upper wall connecting with the sidewalls, and wherein the pull tape is assembled to the operating portion of the actuating member to form a surrounding portion and assembled to the housing to form a rear pulling portion.

16. The plug-in module as claimed in claim 15, wherein the operating portion of the actuating member is located above the upper wall of the housing, and wherein the surrounding portion and the pulling portion of the pull tape form an obtuse angle therebetween as the actuating member in release state and form a right angle as the actuating member in use state.

17. The plug-in module as claimed in claim 15, wherein the operating portion of the actuating member defines a through slot with the pull tape protruding through, and wherein the upper wall of the housing forms a protrusion defining a slit with the pull tape protruding through.

18. A plug-in module for latching to a module receptacle, comprising:
   a housing including a pair of side walls extending along a front-to-back direction and spaced from each other in a parallel relation;
   a restriction and guiding device formed around a front face of said housing;
   a latch mechanism including:
   an actuating member pivotally moveable relative to the side walls about a first pivot axis extending along a first direction;
   an ejector engageably actuated by said actuating member for releasing the plug-in module from the module receptacle; wherein
   a flexible pull tape is operating said actuating member to rotate, under a condition that an inner end section of the pull tape is connected to an outer end region of the actuating member, an outer end section of the pull tape is exposed to an exterior for finger operation by an operator, and an intermediate section between said inner end section and said outer section is engaged with the restriction and guiding device so that the pull tape is allowed to be easily and smoothly pulled forwardly to rotate the actuating member for actuating said ejector; wherein said ejector is pivotally mounted to at lest one of said side walls about a second pivot axis extending along a second direction angled with regard to the first direction, and complementary interengagement devices is formed on said actuating member and said ejector so that the ejector is actuated to move by said actuating member; the outer end section of the pull tape extends beyond the front face of the housing while the inner end section of the pull tape is located behind the front face of the housing.

\* \* \* \* \*